(12) United States Patent
He et al.

(10) Patent No.: US 10,491,797 B2
(45) Date of Patent: Nov. 26, 2019

(54) APPARATUS AND METHOD FOR CONTROLLING IMAGING DEVICES

(71) Applicant: Shanghai Xiaoyi Technology Co., Ltd., Shanghai (CN)

(72) Inventors: Chao He, Shanghai (CN); Baoqi Wang, Shanghai (CN); Tao Ma, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 10 days.

(21) Appl. No.: 15/384,779

(22) Filed: Dec. 20, 2016

(65) Prior Publication Data

US 2018/0176448 A1 Jun. 21, 2018

(51) Int. Cl.
*H04N 5/232* (2006.01)
*G06F 13/16* (2006.01)
*H04N 5/247* (2006.01)

(52) U.S. Cl.
CPC ..... *H04N 5/23206* (2013.01); *G06F 13/1642* (2013.01); *H04N 5/232061* (2018.08); *H04N 5/247* (2013.01)

(58) Field of Classification Search
None
See application file for complete search history.

(56) References Cited

U.S. PATENT DOCUMENTS

| | | | | |
|---|---|---|---|---|
| 6,249,241 | B1* | 6/2001 | Jordan | G01S 7/003 342/41 |
| 8,005,272 | B2* | 8/2011 | Grim | G06K 9/00295 382/115 |
| 2007/0199076 | A1* | 8/2007 | Rensin | H04L 29/06027 726/27 |
| 2011/0149086 | A1* | 6/2011 | Winbush, III | H04N 5/232 348/207.1 |
| 2012/0236160 | A1* | 9/2012 | Rezek | H04N 5/222 348/207.11 |
| 2014/0300758 | A1* | 10/2014 | Tran | H04N 5/225 348/207.1 |
| 2016/0132031 | A1* | 5/2016 | Kozura | H04L 12/2816 700/275 |
| 2016/0283116 | A1* | 9/2016 | Ramalingam | G06F 3/0602 |

* cited by examiner

*Primary Examiner* — James M Hannett
(74) *Attorney, Agent, or Firm* — Cantor Colburn LLP

(57) ABSTRACT

Apparatus and method for controlling imaging devices are disclosed. According to certain embodiments, an apparatus for controlling a plurality of imaging devices includes a receiving unit configured to receive user commands for controlling the imaging devices; a first queue configured to store the user commands; an I/O unit configured to receive device messages from the imaging devices; and a processor configured to determine if the first queue is empty, process one of the user commands in the first queue when the first queue is not empty, and process one of device messages from the imaging devices only if the first queue is empty.

15 Claims, 7 Drawing Sheets

APPARATUS AND METHOD FOR CONTROLLING IMAGING DEVICES

TECHNICAL FIELD

The present application relates to control apparatus, and more specifically to apparatus and method for controlling imaging devices.

BACKGROUND

In many industrial, commercial, and scientific applications, a multi-device system has a master device and a plurality of slave devices to operate in a coordinated manner under a command of the master device. For example, to create immersive virtual-reality experience, a plurality of cameras need to collaborate to capture 360-degree panoramic images. An important issue is how the master device (e.g., a controller) controls and coordinates the plurality of cameras to simultaneously conduct a set of operations.

Generally, the master device processes a command (e.g., take a picture) and sends it to a slave device, and the slave device will send a response back to the master device after the picture is taken, so that the master device knows the slave device has finished its work and it can send the command to the next slave device. In this case, if time required to process and send the command to a slave device is T1, and waiting time for receiving the response from the slave device is T2, then a delay time $T_{delay}$ for operating each slave device is $T_{delay}$=T1+T2.

If the master device only has one processing thread to control the slave devices, such that the master device will have to wait for the response from one slave device before it could send the command to the next slave device, the total delay time $T_{delay}$ for all slave devices can become undesirably large. For example, when the multi-device system has four slave devices, a total delay of the operation is $4 \times T_{delay}$. Thus, a total delay of the multi-device system can be unacceptably long, and will moreover increase rapidly with an increasing of the number of slave devices. In this case, the number of the slave devices of the multi-device system will be limited by the delay.

If the master device sends commands to the plurality of slave devices via a plurality of threads respectively, the total delay of the multi-device system will be reduced. Because the plurality of threads work on the commands simultaneously, the total delay of the entire multi-device system is $T_{delay}$, no matter how many slave devices the system has. However, a throughput of the multi-device system may be significantly increased as the number of the threads increases, providing a high computational load on the system.

The apparatuses and methods of this disclosure address the tradeoff between delay time and throughput of a multi-device system.

SUMMARY

Consistent with one disclosed embodiment of the present disclosure, an apparatus for controlling a plurality of imaging devices is provided, comprising: a receiving unit configured to receive user commands for controlling the imaging devices; a first queue configured to store the user commands; an I/O unit configured to receive device messages from the imaging devices; and a processor configured to: determine if the first queue is empty, process one of the user commands in the first queue when the first queue is not empty, and process one of device messages from the imaging devices only if the first queue is empty.

Consistent with one disclosed embodiment of the present disclosure, a method for controlling a plurality of imaging devices is provided, comprising: receiving user commands for controlling the imaging devices; storing the user commands in a first queue; receiving device messages from the imaging devices; determining if the first queue is empty; processing one of the user commands in the first queue when the first queue is not empty; and processing one of device messages from the imaging devices only if the first queue is empty.

Consistent with one disclosed embodiment of the present disclosure, a multi-device system comprising a plurality of slave devices and a master device for controlling the slave devices is provided, wherein the master devices comprises: a receiving unit configured to receive user commands for controlling the imaging devices; a first queue configured to store the user commands; an I/O unit configured to receive device messages from the imaging devices; and a processor configured to: determine if the first queue is empty, process one of the user commands in the first queue when the first queue is not empty, and process one of device messages from the imaging devices only if the first queue is empty.

Consistent with one disclosed embodiment of the present disclosure, a non-transitory computer readable medium with instructions stored thereon is provided, that when executed by a processor, perform steps comprising: receiving user commands for controlling the imaging devices; storing the user commands in a first queue; receiving device messages from the imaging devices; determining if the first queue is empty; processing one of the user commands in the first queue when the first queue is not empty; and processing one of device messages from the imaging devices only if the first queue is empty.

It is to be understood that both the foregoing general description and the following detailed description are exemplary and explanatory only and are not restrictive of the invention, as claimed.

BRIEF DESCRIPTION OF THE DRAWINGS

Methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Features and characteristics of the present disclosure, as well as methods of operation and functions of related elements of structure and the combination of parts and economies of manufacture, may become more apparent upon consideration of the following description with reference to the accompanying drawings, all of which form a part of this specification. It is to be understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1A:
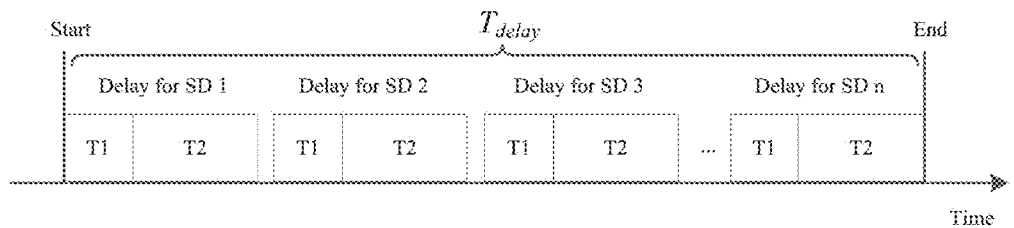
FIGS. 1A~1C are schematic diagrams illustrating three examples of delay time for a multi-device system.
Figure 1B:
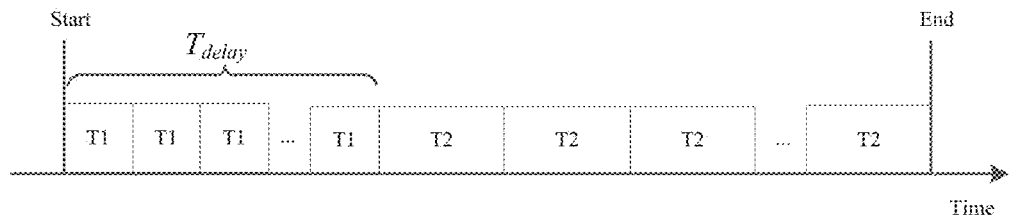
Figure 1C:
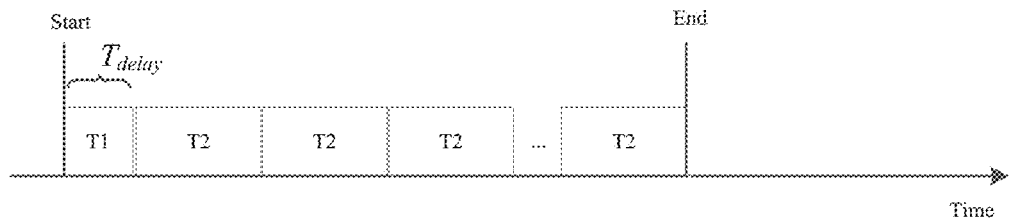

FIGS. 1A~1C are schematic diagrams illustrating three examples of delay time for a multi-device system. As shown in FIG. 1A, when an operation is processed in one thread for a multi-device system having a master device and a plurality of slave devices (SD1, SD2, SD3, . . . , SDn), a total delay $T_{delay}$ of the multi-device system may be $T_{delay}=N\times(T1+T2)$, wherein, for example, T1 is a time required to process a user command and send the user command to one slave device, T2 is waiting time for the master device to receive and process device messages from the slave device, N is a number of the slave devices.

Generally, T1 includes time for the master device to process the user command, while T2 includes a sum of time for the user command to be transmitted to the slave device, time for the slave device to process the instruction, and time for the device to be transmit a message back to the master device. And the master device usually has better computation ability than the slave device. Therefore, T2 is generally much greater than T1.

An apparatus and a method of the disclosure allow the master device to process and send the user command to the plurality of slave devices before receiving and processing the device messages from the slave device. Because the slave devices start to operate immediately after they receive the user command, the total delay $T_{delay}$ between receiving a command and executing the user command only approximately includes time for the master device to process and send the user command.

In one embodiment, the master device has only one thread, the user command is processed and sent to each of the slave devices in sequence, and the device messages from the slave devices are also received and processed by the master device in sequence. Because each of the slave devices starts to operate immediately after receiving the user command, the total delay only includes time for processing and sending the user command on the end of the master device. That is, as shown in FIG. 1B, $T_{delay}=N\times T1$, and the throughput of the multi-device system is very low as only one thread is running. The device messages will be processed after the slave devices start to operate. It is possible that, the master device has no further command to process when the slave devices are sending the device messages back for processing. Therefore, although the operation takes approximately the same time as FIG. 1A to end, the total delay of the system in FIG. 1B is reduced.

In another embodiment, the master device has a plurality of threads, corresponding to the number of slave devices, to process and send the user command to each of the slave devices via the threads simultaneously. Because the threads work simultaneously to process and send the user commands, the total delay equals the delay for processing and sending one command to one slave device. That is, as shown in FIG. 1C, $T_{delay}=T1$. However, the device messages from the slave devices may still be received and processed by the master device in sequence, so as to reduce the throughput of the multi-device system. In this case, the total delay $T_{delay}=T1$, and the throughput of the multi-device system is relatively low.

Nevertheless, the apparatus and method of the disclosure may reduce the total delay of the multi-device system significantly by processing the user command for the slave devices before the device messages, and therefore address the tradeoff between delay time and throughput of a multi-device system, providing a better user experience.

Embodiments will be further described in detail as below.

Figure 2:
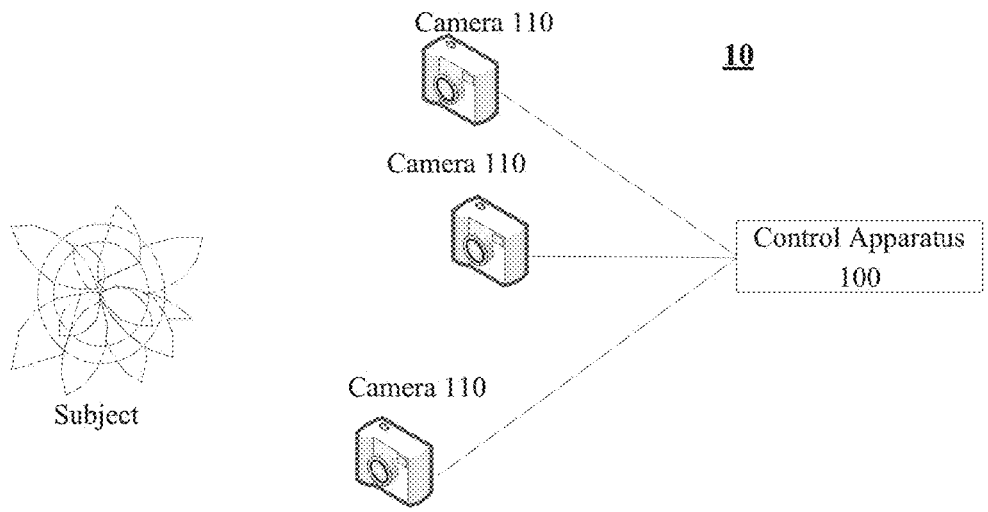
FIG. 2 is a schematic diagram illustrating an example of a multi-device system, according to one exemplary embodiment.

FIG. 2 is a schematic diagram illustrating an example of a multi-device system 10. Referring to FIG. 2, for example, multi-device system 10 may include a control apparatus 100 and multiple slave devices (e.g., cameras 110) to capture 360-degree panoramic images of a flower simultaneously. However, embodiments of the slave devices are not limited to cameras alone. Each of the multiple slave devices may be a device with certain computing and/or communication capabilities, such as a smart wearable device (e.g., a wrist band), a smart air conditioner, a smart air purifier, a smart refrigerator, a smart socket, a smart door bell, etc. Moreover, a number N of the slave devices may be any natural number greater than 1. Solely for the purpose of illustration, the following description assumes that the slave devices are three smart cameras (i.e., N=3) capable of capturing images simultaneously, as shown in FIG. 2.

Camera 110 may be an imaging device that includes any of optical devices, lenses, charge coupled devices (CCD), complementary metal-oxide-semiconductor (CMOS) detector arrays and driving circuitry, and other arrangements of optical components, electronic components, and control circuitry used in generating image data from light of various wavelengths. For example, camera 110 may be an action camera, a digital camera, a web camera, or digital single-lens reflex (DSLR) camera. Camera 110 may also be embedded in another device, such as a smartphone, a computer, a personal digital assistant (PDA), a monitoring device, a video gaming console, etc.

Camera 110 may be configured to capture one or more images of an environment in a variety of ways. As used herein, an "image" refers to, in part or in whole, a static or dynamic visual representation including, but not limited to, a photo, a picture, a graphic, a video, a hologram, a virtual reality image, an augmented reality image, other visual representations, or combinations thereof. For example, camera 110 may be configured to capture images initiated by a user, by programming, by a hardware setting, or by a combination thereof.

In some embodiments, when camera 110 is configured to capture images by software or hardware programming or by a hardware setting, image capture may be performed upon occurrence of one or more predetermined conditions. For example, multiple cameras 110 may be controlled by control apparatus 100 to capture images simultaneously or in an ordered fashion. Alternatively or additionally, a set of predetermined conditions, for example, the sensing of a moving object, can trigger cameras 110 to capture images. In some embodiments, capturing images may include placing cameras 110 in a mode or setting capable of capturing one or more images.

Camera 110 may include various features suitable for panorama creation. In one embodiment, camera 110 may use a 16 MP (megapixel) image sensor capable of capturing high-resolution (e.g., 4608×3456) photos with enhanced color and contrast. Camera 110 may have a wide field of view, such as a 155-degree viewing angle. Camera 110 may further be configured to record videos with various resolutions and frame rates, such as 1296p at 30 fps, and 1080p at 30 fps or 60 fps.

Each of the imaging devices may be configured to perform wireless and/or wired communication with other devices, including control apparatus 100. For example, camera 110 may include a built-in Bluetooth® transceiver and/or Wi-Fi module for wireless connection. Each of the multiple slave devices may further include a Universal Serial Bus (USB) interface for connecting a communication cable.

In exemplary embodiments, control apparatus 100 may generate and transmit a plurality of wireless signals. In one embodiment, control apparatus 100 may periodically transmit the signals at predetermined time intervals. In another embodiment, control apparatus 100 may transmit the signals non-periodically. As a master device in multi-device system 10, control apparatus 100 may have a better computation ability than the slave devices. For example, control apparatus 100 may be based on a Broadcom BCM 43340 chip. The BCM 43340 chip is a single-chip quad-radio device providing support for IEEE 802.11n, and is designed to address the requirements of minimal power consumption and compact size.

In exemplary embodiments, control apparatus 100 may transmit the wireless signals in any suitable manner. In one embodiment, control apparatus 100 may transmit the wireless signals via a local network that connects both control apparatus 100 and the multiple slave devices. In another embodiment, control apparatus 100 may broadcast the wireless signals in certain broadcast channels. Control apparatus 100 may scan for and receive the broadcast signals. In yet another embodiment, control apparatus 100 may form a peer-to-peer (P2P) connection with each of the multiple slave devices and transmit the wireless signals via the P2P connections.

For illustrative purpose only, the following descriptions assume the wireless signals are generated and transmitted using IEEE 802.11n technology. IEEE 802.11n is a wireless-networking standard that uses multiple antennas to increase data rates. An 802.11n network can achieve 72 megabits per second (Mbps) on a single 20 MHz channel with one antenna and 400 ns guard interval, and it is possible to go up to 150 Mbps. However, the principles and implementations of the present disclosure may also be applied to other communication technologies.

Multiple adapters, connectors and/or even cables may be adopted for the connections, but, for clarity, are not shown in the figures.

Figure 3:
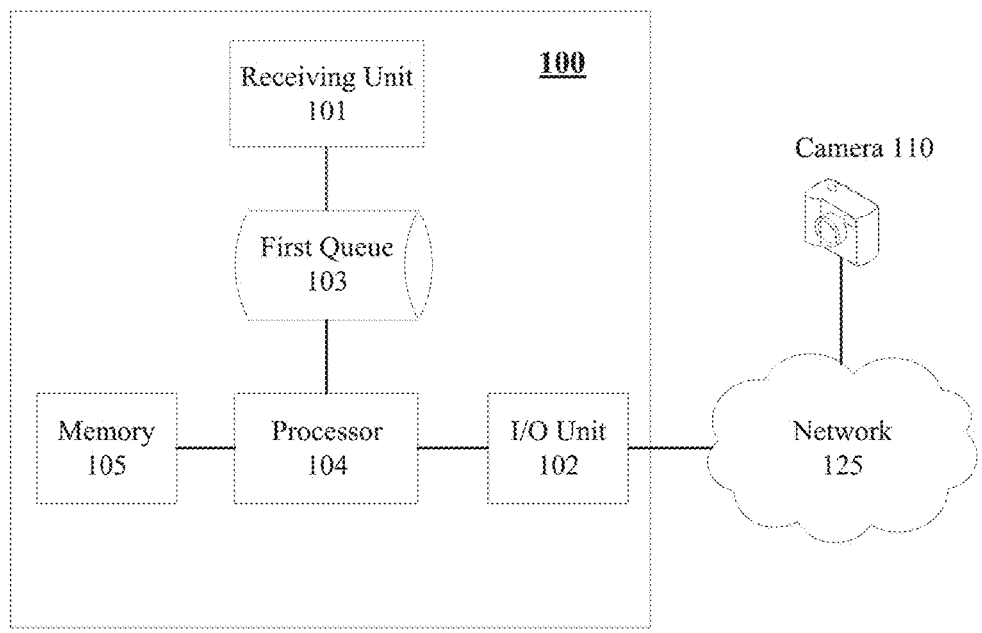
FIG. 3 is a block diagram of a control apparatus for controlling a plurality of imaging devices, according to one exemplary embodiment.

FIG. 3 is a block diagram of control apparatus 100 for controlling a plurality of imaging devices. Control apparatus 100 may be an electronic device capable of controlling each of the multiple cameras to simultaneously perform certain operations upon receipt of corresponding user commands. The operations may include Start/Stop View Finder, Set Video Resolution, Start/Stop Video Recording, Set Picture Size, Take a Picture, and the like. In various embodiments, control apparatus 100 may be a remote control, a mobile phone, a tablet computer, a personal computer, a personal digital assistant (PDA), an MP4 (Moving Picture Experts Group Audio Layer IV) player, etc.

Referring to FIG. 3, control apparatus 100 may include a receiving unit 101, an input/output interface 102, a first queue 103, a processor 104, and a memory 105.

Receiving unit 101 may receive a user command for controlling the cameras. In one embodiment, receiving unit 101 may be a touch screen that displays a user interface, and a user may input the user command via the user interface. In another embodiment, receiving unit 101 may be a keyboard by which a user may enter the user command. In yet another embodiment, receiving unit 101 may include several buttons corresponding to a variety of commands, and the user may press a button to input the user command.

The user command may be, but is not limited to, a command that is directly received from a user. For example, receiving unit 101, such as a communication unit, may also receive a user command from another device that stores the user command in advance. The other device may be a memory device built within or outside control apparatus 100. Thus, the user command may be input by the user or generated by another device or even control apparatus 100 itself.

I/O interface 102 may be configured for two-way communication between control apparatus 100 and the imaging devices. For example, processor 104 may send operating signals to cameras 110 through I/O interface 102. Processor 104 may receive captured images and/or video frames from cameras 110 through I/O interface 102. I/O interface 102 may communicate with cameras 110 to exchange data through network 125. Network 125 may include any type of wired or wireless network that may allow transmitting and receiving data. For example, network 125 may include a regional or nationwide cellular network, a local wireless network (e.g., Bluetooth™, near field communication, infrared, or WiFi), and/or a wired network (e.g., wired through cables).

First queue 103 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. First queue 103 may be integrated within a memory device or may be an independent device.

First queue 103 may store a plurality of user commands. The user commands may be queued up in first queue 103 according to a first-in-first-out (FIFO) method. In an example, when a first command is still waiting in first queue 103 for processing, a second command is input to first queue 103. Then the second command is queued after the first queue, and the first command will be processed before the second command according to the FIFO method. Also, it is possible to queue up commands according to priorities, if the priorities are assigned to the user commands. In another example, when a first command having a first priority is still waiting in first queue 103 for processing, a second command having a second priority is input to first queue 103 and the second priority is higher than the first priority. Then the second command will be processed before the first queue because of the priority.

The user command may have an operation type. For example, the user command may correspond to a camera operation for the imaging devices. As discussed above, the camera operation may include Start/Stop View Finder, Set Video Resolution, Start/Stop Video Recording, Set Picture Size, Take a Picture, and the like.

Memory 105 may be configured to store the instructions and/or data used for creating panoramic images. Memory 105 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk, or a hard disk.

Memory 105 may be configured to store the computer instructions and data that may be used by processor 104 to perform functions consistent with the present disclosure. For example, memory 105 may store the source images to be stitched and the created panoramic images. As another example, memory 105 may store computer instructions for performing the disclosed methods for controlling imaging devices.

Processor 104 may execute computer instructions (program code) and perform functions in accordance with techniques described herein. Computer instructions include routines, programs, objects, components, data structures, procedures, modules, and functions, which perform particular functions described herein. For example, processor 104 may determine whether first queue 103 is empty or not. When first queue 103 is not empty, processor 104 processes one of the user commands in first queue 103, and when first queue 103 is empty, processor 104 processor device messages from the imaging devices. The disclosed methods for controlling imaging devices will be further described below.

Figure 4:
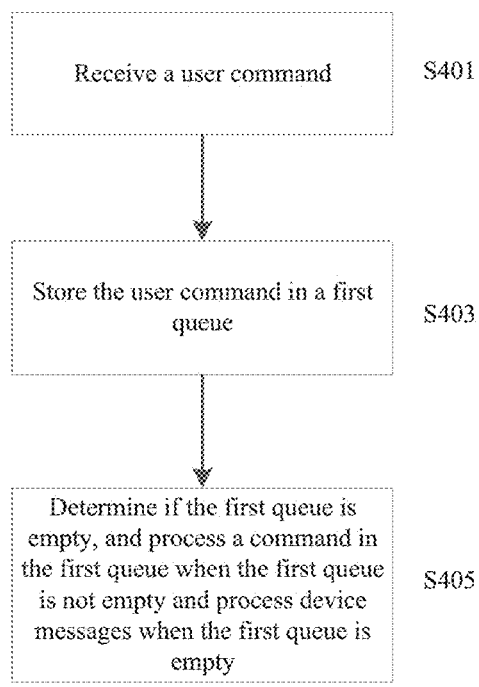
FIG. 4 is a flow chart of a method for controlling a plurality of imaging devices, according to one exemplary embodiment.

FIG. 4 is a flow chart of a method 400 for controlling a plurality of imaging devices. For example, the method 400 may be used in control apparatus 100. Referring to FIG. 4, method 400 may include the following steps.

In S401, user commands are received via receiving unit 101. As described above, the user command may include a command directly input by a user or a command generated by control apparatus 100. For example, receiving unit 101 receives, from the user, a command for a camera operation to take a picture of a subject. Generally, the camera operation may include two operation phases: a first phase for instructing the cameras to operate and a second phase for processing device messages from the cameras. The user command may trigger the first operation phase, so that the cameras start to operate accordingly.

In S403, the user commands are stored in a first queue 103. First queue 103 has been disclosed above, and description of which will be omitted herein for clarity.

In S405, whether first queue 103 is empty or not is determined via processor 104. Processor 104 further processes one of the user commands in first queue 103 when first queue 103 is not empty, and processes device messages from the imaging devices only if first queue 103 is empty.

Processing one of the user commands may include sending the command to corresponding devices. During this step, the command in first queue 103 being processed may or may not be the user command that is just stored in S403, as first queue 103 may store more than one command. As described above, first queue 103 may be implemented according to the FIFO method. In this case, the command stored in S403 may have to wait until other commands that arrived in first queue 103 earlier are processed. Details of S405 will be further discussed with reference to FIG. 5.

Figure 5:
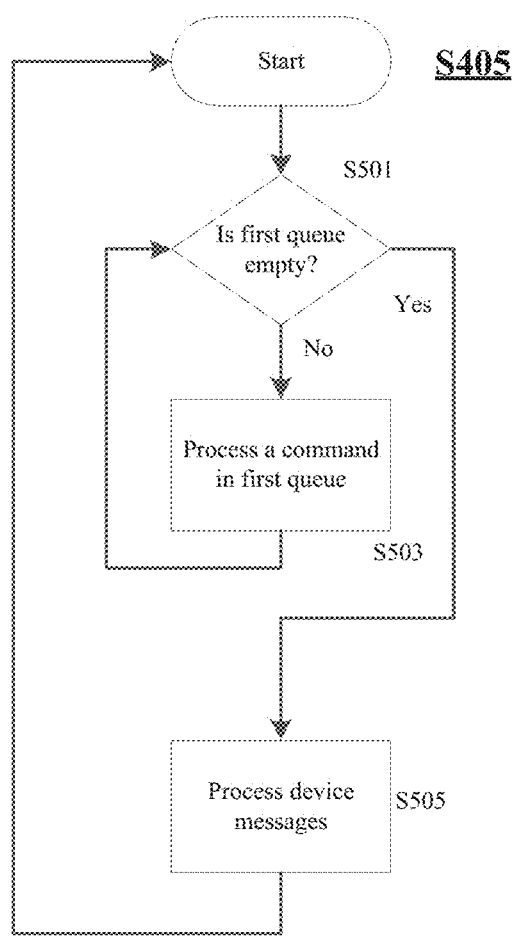
FIG. 5 is a flow chart of S405 in FIG. 4, according to one exemplary embodiment.

FIG. 5 is a flow chart of S405 in FIG. 4, according to one exemplary embodiment. As shown in FIG. 5, S405 further includes S501, S503, and S505.

When S405 of FIG. 5 starts, processor 104 determines if first queue 103 is empty (S501).

When first queue 103 is not empty, processor 104 processes one of the user commands in first queue 103 (S503). The command in first queue 103 may be processed by multiple threads or by a single thread. For example, the single thread may process the command in first queue 103 and send the command to each of the cameras without waiting for the device messages from the cameras. Because processor 104 runs so fast, those operation delays between the cameras may be neglected. In another example, the command in first queue 103 is assigned to each of the multiple of threads corresponding to the imaging devices, and processed via the threads, the cameras operate at approximately the same time. Therefore, a delay time of control apparatus 100 may be further reduced as compared with being processed by one thread.

After the one of the user commands in first queue 103 is processed, processor 104 once again determines if first queue 103 is empty. If first queue 103 is still not empty, processor 104 continues to process the next command in first queue 103. The above process (S501-S503) repeats until first queue 103 turns empty. If it is determined that first queue 103 is empty, processor 104 further processes the device messages.

The device messages may include response messages sent back to control apparatus 100 from imaging devices 110, indicating status of the imaging devices. For example, the response message may indicate that a picture has been taken, then processor 104 may process this response message and the multi-device system may notify the user of the picture being ready for review. In another example, the response message may indicate an error during the camera operation occurred, then processor 104 may process this response message and the multi-device system may notify the user of the error and possible solutions. The device message further may include regular communication messages between control apparatus 100 and the imaging devices.

The device messages may be respectively stored in each imaging device, and control apparatus 100 may process the device messages from the imaging devices (S505). The device messages may be processed via one thread or via multiple threads. However, because message processing is not time-sensitive and lower throughput of the multi-device system is desirable, the device messages may be processed via one thread.

After the device messages are processed, processor 104 goes back to the start point and runs the above process (S501-S505) again.

In one embodiment, processor 104 reads and processes one device message from one imaging device and then goes back to the start point, so as to determine if first queue 103 contains any new user command. If the new user command is received and stored in first queue 103, the device messages from other imaging device will have to wait for the new user command to be processed. On the other hand, if no new user command has been received and stored in first queue 103, processor 104 may continue to process the device messages until a new user command arrives.

Figure 6:
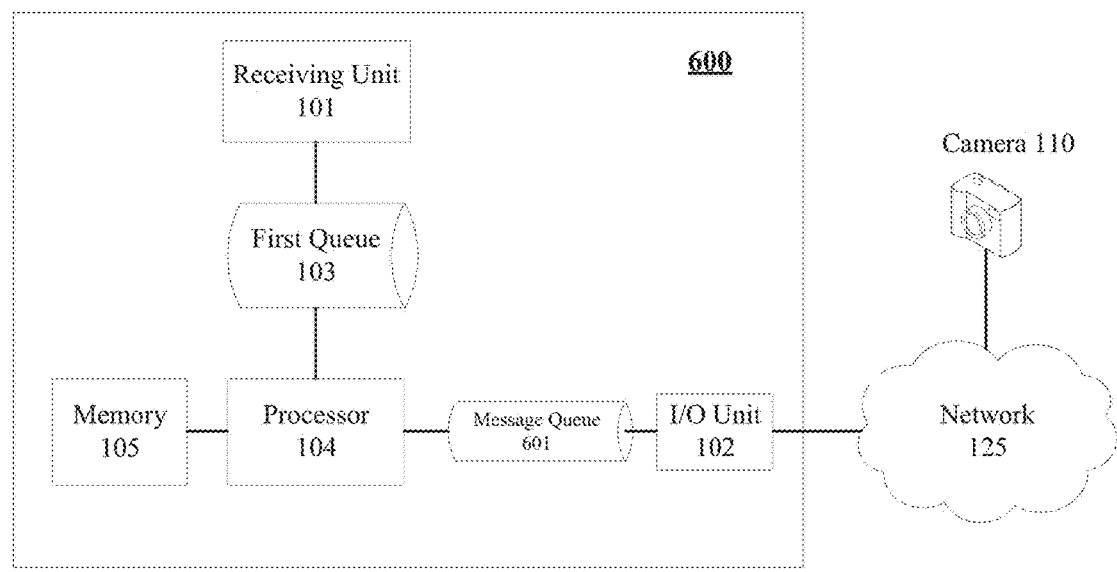
FIG. 6 is a block diagram of another control apparatus for controlling a plurality of imaging devices, according to another exemplary embodiment.

Control apparatus 100 may further include a message queue for temporarily storing device messages from the imaging devices, as shown in FIG. 6.

FIG. 6 is a block diagram of control apparatus 600 for controlling a plurality of imaging devices, according to another exemplary embodiment.

Compared with control apparatus 100 as shown in FIG. 3, control apparatus 600 in FIG. 6 may further include a second queue, that is, a message queue 601 disposed between processor 104 and I/O unit 102. Message queue 601 may, for example, temporarily store device messages received from the imaging devices. Therefore, when first queue 103 is empty, processor 104 may read the device messages directly from message queue 601. Similarly to first queue 103, the device messages may be stored in message queue 601 according to a first-in-first-out (FIFO) method. In another example, when the imaging devices send device messages to message queue 601, the device messages may be assigned with priorities. In this case, a device message having a highest priority will be processed first, so that urgent messages may be read and processed before non-urgent messages.

Figure 7:
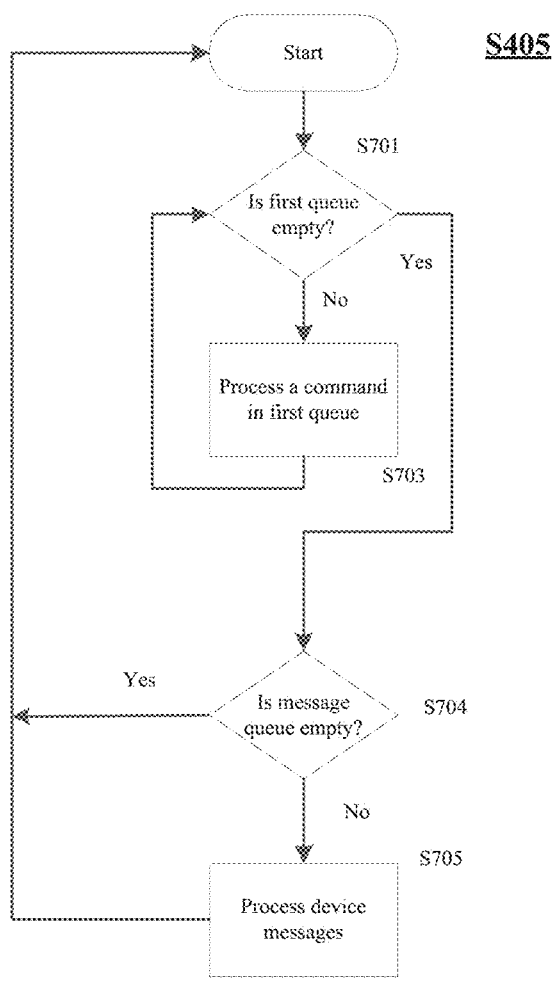
FIG. 7 is another flow chart of S405 for another control apparatus, according to another exemplary embodiment.

FIG. 7 is another flow chart of S405 for control apparatus 600, according to a second exemplary embodiment. As shown in FIG. 7, S405 may include S701, S703, S704, and S705. When S405 of FIG. 7 starts, processor 104 checks on first queue 103 and determines if first queue 103 is empty (S701). When first queue 103 is not empty, processor 104 processes a command in first queue 103 (S703), and when first queue 103 is empty, processor 104 determines if message queue 601 is empty (S704). When message queue 601 is empty, processor 104 goes back to the start point, and runs the above process (S701-S704) again. And when message queue 601 is not empty, processor 104 processes device messages from message queue 601 (S705).

In one embodiment, processor 104 reads and processes one device message from message queue 601 and then goes back to the start point, so as to determine if first queue 103 contains any new user command. If the new user command is received and stored in first queue 103, the rest of the device messages will have to wait for the new users command to be processed. On the other hand, if no new command is received and stored in first queue 103, processor 104 may continue to process the device messages until a new user command arrives.

Figure 8:
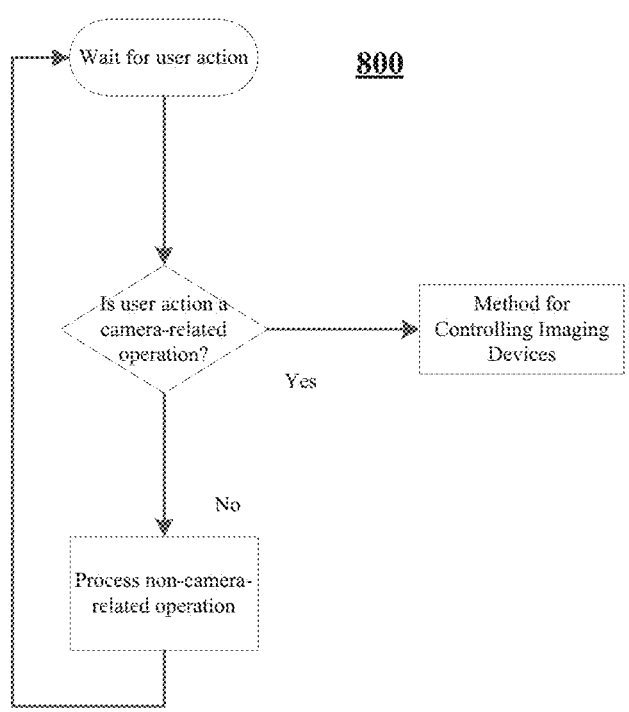
FIG. 8 is a flow chart of an operation identifying process, according to yet another exemplary embodiment.

FIG. 8 is a flow chart of a command-identifying process 800, according to an exemplary embodiment.

Control apparatus 100 may further perform the command-identifying process 800 to identify an incoming user command and to determine if the operation specified by the command is related to, for example, cameras. In one embodiment, turning on a screen of control apparatus 100 is identified, via receiving unit 101, as a non-camera-related operation, and therefore the method for controlling multiple devices disclosed by embodiments of the disclosure is not called for the non-camera-related operation. That is, receiving unit 101 identifies commands as non-camera-related operations and camera-related operations, and only accepts commands for the camera-related operation, and ignores others. The operation identifying process 800 may be performed by another device other than receiving unit 101.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by a processor executing software instructions stored in the computer-readable storage medium.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks may be substantially executed in parallel, and sometimes, they may also be executed in the reverse order, depending on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more computer-readable storage media (including but not limited to a magnetic disk memory, a CD-ROM, an optical memory, etc.) containing computer-readable program codes.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, may be implemented by computer program instructions. These computer program instructions may be provided to a processor of a computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that may direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage may be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries may be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an", and "the" include plural references unless the context clearly dictates otherwise.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. An apparatus for controlling a plurality of imaging devices, comprising:
    a receiving unit configured to receive user commands for controlling the imaging devices;
    a first queue configured to store the user commands;
    an interface configured to receive device messages from the imaging devices;
    a second queue configured to store the device messages from the imaging devices; and
    a processor configured to:
        determine if the first queue is empty;
        process one of the user commands in the first queue when the first queue is not empty;
        process one of the device messages in the second queue only if the first queue is empty; and
        send the processed user command from the apparatus to a corresponding imaging device.

2. The apparatus of claim 1, wherein the user command specifies a camera operation to be performed by the imaging devices.

3. The apparatus of claim 2, wherein the camera operation comprises at least one of starting/stopping View Finder, setting video resolution, starting/stopping video recording, setting picture size, or taking a picture.

4. The apparatus of claim 1, wherein the device messages comprise response messages generated by the imaging devices in response to the user command.

5. The apparatus of claim 1, wherein the processor processes the user command in the first queue via a plurality of threads corresponding to the imaging devices.

6. The apparatus of claim 1, wherein the processor is configured to process the device messages in sequence.

7. A method for controlling a plurality of imaging devices by a control apparatus, comprising:
    receiving user commands for controlling the imaging devices;
    storing the user commands in a first queue;
    receiving device messages from the imaging devices;
    storing the device messages in a second queue;
    determining if the first queue is empty;
    processing one of the user commands in the first queue when the first queue is not empty; and
    processing one of the device messages in the second queue only if the first queue is empty, wherein the method further comprises sending the processed user command from the control apparatus to a corresponding imaging device.

8. The method of claim 7, wherein the user command specifies a camera operation to be performed by the imaging devices.

9. The method of claim 8, wherein the camera operations comprise at least one of starting/stopping View Finder, setting video resolution, starting/stopping video recording, setting picture size, or taking a picture.

10. The method of claim 7, wherein the device messages comprise response messages generated by the imaging devices in response to the user command.

11. The method of claim 7, wherein the user command in the first queue is processed via a plurality of threads corresponding to the imaging devices.

12. The method of claim 7, wherein the device messages from the imaging devices are processed in sequence.

13. A multi-device system comprising:
a plurality of slave devices; and
a master device for controlling the slave devices, the master devices comprising:
a receiving unit configured to receive user commands for controlling the imaging devices;
a first queue configured to store the user commands;
an interface configured to receive device messages from the imaging devices;
a second queue configured to store the device message; and
a processor configured to:
determine if the first queue is empty;
process one of the user commands in the first queue when the first queue is not empty;
process one of the device messages in the second queue only if the first queue is empty, and send the processed user command from the master device to a corresponding imaging device.

14. The multi-device system of claim 13, wherein the slave devices comprises smart cameras.

15. A non-transitory computer readable medium with instructions stored thereon, that when executed by a processor of a control apparatus, perform steps comprising:
receiving user commands for controlling the imaging devices;
storing the user commands in a first queue;
receiving device messages from the imaging devices;
storing the device message in a second queue;
determining if the first queue is empty;
processing one of the user commands in the first queue when the first queue is not empty; and
processing one of the device messages in the second queue only if the first queue is empty, wherein the method further comprises sending the processed user command from the control apparatus to a corresponding imaging device.

* * * * *